(12) United States Patent
Devaraj et al.

(10) Patent No.: US 11,375,361 B2
(45) Date of Patent: Jun. 28, 2022

(54) DYNAMIC TUNING OF MOBILE NETWORK DEVICE CONFIGURATION BASED ON LOCATION

(71) Applicant: Hewlett Packard Enterprise Development LP, Houston, TX (US)

(72) Inventors: Sasindran Devaraj, Karnataka (IN); Suman Samarthi, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/209,348

(22) Filed: Mar. 23, 2021

(65) Prior Publication Data

US 2021/0345093 A1 Nov. 4, 2021

(51) Int. Cl.
| | |
|---|---|
| *H04W 8/22* | (2009.01) |
| *H04W 4/40* | (2018.01) |
| *H04W 4/021* | (2018.01) |
| *H04W 84/00* | (2009.01) |
| *H04W 88/08* | (2009.01) |

(52) U.S. Cl.
CPC ............ *H04W 8/22* (2013.01); *H04W 4/021* (2013.01); *H04W 4/40* (2018.02); *H04W 84/005* (2013.01); *H04W 88/08* (2013.01)

(58) Field of Classification Search
CPC ..... H04W 4/50; H04W 4/029; H04W 84/005; H04W 84/12; H04W 12/08; H04W 84/045; H04W 4/024; H04W 4/42; H04W 48/02; H04W 48/08; H04W 12/63; H04W 12/50; H04W 4/021

See application file for complete search history.

(56) References Cited

U.S. PATENT DOCUMENTS

| | | | |
|---|---|---|---|
| 9,715,816 B1* | 7/2017 | Adler ................... | G08B 21/24 |
| 10,645,528 B2* | 5/2020 | Vrzic ................... | H04W 36/18 |
| 2010/0087981 A1* | 4/2010 | Orozco-Perez ......... | H04L 67/12 |
| | | | 701/29.5 |

(Continued)

FOREIGN PATENT DOCUMENTS

| | | | |
|---|---|---|---|
| CN | 101801083 A | * | 8/2010 |
| CN | 108982118 A | * | 12/2018 |

(Continued)

*Primary Examiner* — Dung Hong
(74) *Attorney, Agent, or Firm* — Jaffery Watson Mendonsa & Hamilton (57) ABSTRACT

Dynamic tuning of mobile network device configuration based on location is described. An example of a storage medium includes instructions for switching a mobile network device in a vehicle to a maintenance mode based at least in part on detection of a first location, the first location being a maintenance hub location; enabling administrative communications and disabling user communications for the mobile network device in the maintenance mode; receiving configuration data for the mobile network device from an external server in the maintenance mode, the configuration data being based at least in part on a route for the vehicle; switching the mobile network device to a service mode based at least in part on detection of a second location that is different than the first location; and enabling service communications and disabling administrative communications for the mobile network device in the service mode.

20 Claims, 7 Drawing Sheets

(56) References Cited

U.S. PATENT DOCUMENTS

2014/0165159 A1\* 6/2014 Baade ..................... H04L 63/08
                                                                726/4
2017/0238258 A1\* 8/2017 Ramalho De Oliveira .................
                                                         H04W 52/0261
                                                                455/574

FOREIGN PATENT DOCUMENTS

| CN | 110366139 | A | \* | 10/2019 | | |
|---|---|---|---|---|---|---|
| CN | 113630815 | A | \* | 11/2021 | | |
| JP | 6085353 | B2 | \* | 2/2017 | ............. | G06F 16/29 |

\* cited by examiner

DYNAMIC TUNING OF MOBILE NETWORK DEVICE CONFIGURATION BASED ON LOCATION

BACKGROUND

The requirements for operation of a mobile network device may vary greatly based on the location that the network device is operating from. For example, there are different legal requirements in each jurisdiction within which the network device may operate, as well as different features that can be provided to users that relate to a particular location. For this reason, the configuration of a network device needs to be set or tuned with respect to location of the network device.

However, in the operation of a mobile network device, such as a network device installed or contained in a vehicle, the network device may be in motion through multiple jurisdictions and varying locales in a particular route, thereby greatly complicating the configuration of the device.

Further, the use of an external source to provide the necessary configuration information for the mobile network device can open up the network device to a malicious attack, including an attack by a client of the network device. Thus, the configuration process for a mobile network device can be a significant security concern for the operator of the device.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to dynamic tuning of mobile network device configuration based on location.

In some embodiments, an apparatus, system, or process operates to enable dynamic tuning of the configuration of a mobile network device, such as an access point, based on location. In some embodiments, a mobile network device is to receive required configuration data based on a determination of a location of the mobile network devices.

In some embodiments, a mobile network device includes a maintenance hub feature that allows configuration of the network device based on location utilizing a wireless link with an external server (the server being external to a vehicle containing the network device) while also providing protection against a malicious attack on the network device utilizing such link. In some embodiments, the maintenance hub allows receipt of configuration data only when the mobile network device is located in a maintenance hub as indicated by detection of a correct location for the maintenance hub, and further only allows service to users when the mobile network device is not located in a maintenance hub.

In some embodiments, the mobile device includes or is connected with a location detection component to determine a current location of the mobile network device. The location detection element may include, but is not limited to, a GPS (Global Positioning System) component. In some embodiments, a mobile network device is to utilize the location detection component to determine when the mobile network device is located in a maintenance hub. Upon detecting a location within a maintenance hub, the mobile network device is to switch to a maintenance mode, the mobile network device to enable administrative communications and disable service communications in the maintenance mode. Upon detecting a location that is outside of a maintenance mode, the mobile network device is to exit the maintenance mode and disable administrative communications. In some embodiments, outside of the maintenance hub the mobile network device is further to enable a service mode, the mobile network device to enable service communications in the service mode. The administrative communications are disabled in any mode other than the maintenance mode.

As used herein, "mobile network device" refers to a network device, such as an access point (AP), to provide mobile operation. A mobile network device includes a network device for a vehicle, such as a network device that installed or embedded in such a vehicle. A vehicle may include, but is not limited to, a train car or other rail vehicle; an aircraft; a motor coach/bus, automobile, or other motor vehicle; a ship or other watercraft; or other type of vehicle. A vehicle may include any type of control operation, including a human controlled vehicle, an autonomous vehicle, and a remote or centrally controlled vehicle.

As used herein, access point (AP) (also referred to as a wireless access point (WAP)) refers to a networking hardware device that allows wireless devices to connect to a network, including connection to the Internet or an intranet. The AP may connect to a router (via a wired network) as a standalone device, or may be an integral component of the router itself. An AP may include, but is not limited to, communication using any IEEE 802.11 Wi-Fi standards, Bluetooth™ communications, or other standards.

Figure 1:
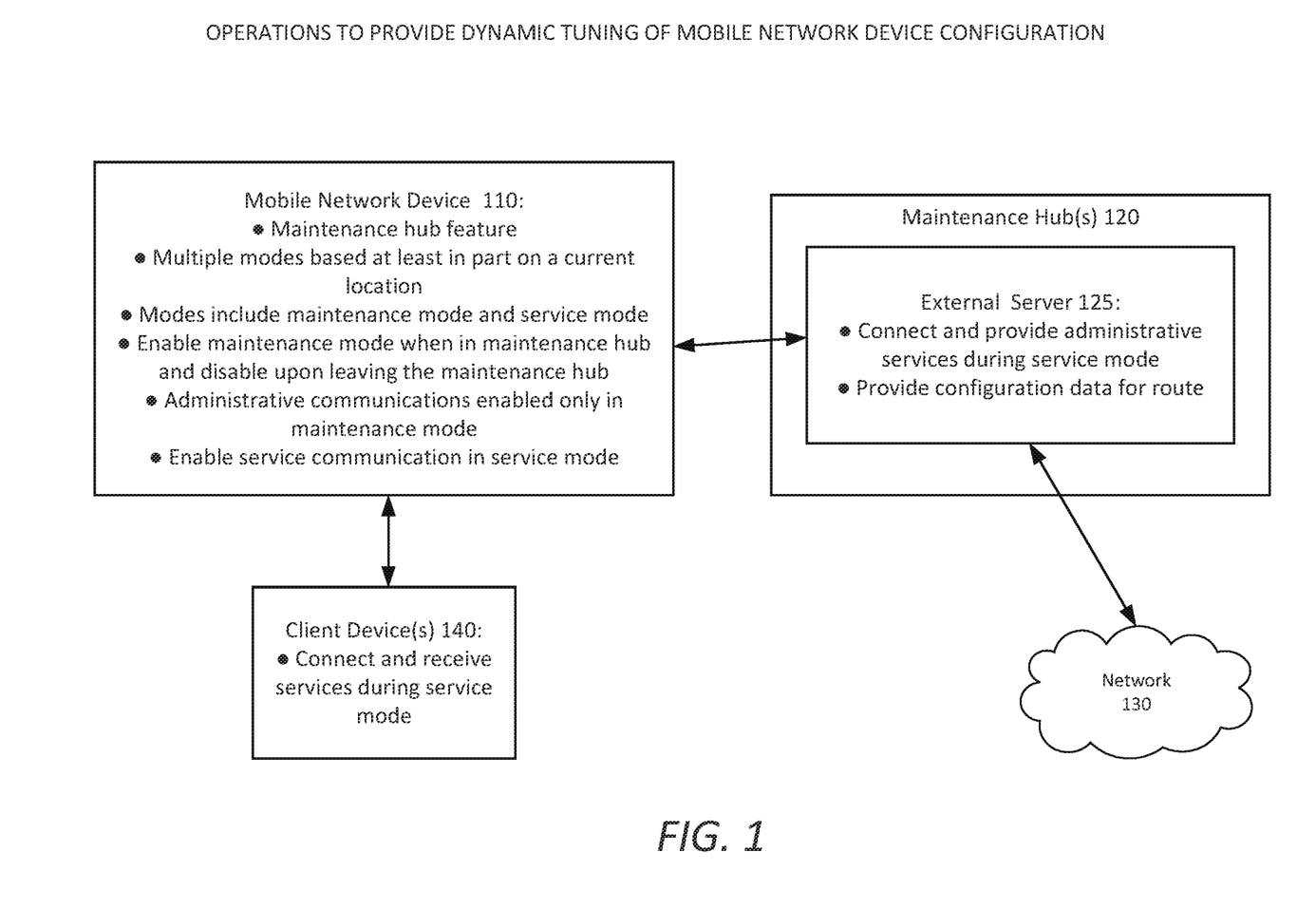
FIG. 1 is an illustration of operations to provide dynamic tuning of a mobile network device configuration, according to some embodiments.

FIG. 1 is an illustration of operations to provide dynamic tuning of a mobile network device configuration, according to some embodiments. In some embodiments, a mobile network device 110, such as an access point, is operable to provide a maintenance hub feature that allows configuration of the mobile network device 110 utilizing a link with an external server 125 of a maintenance hub 120 while providing protection against a malicious attack on the network device utilizing such link. The external server 125 may include a link to a network 130.

In some embodiments, the maintenance hub feature allows receipt of configuration data from the external server 125 only when the mobile network device 110 is located in the maintenance hub 120 as indicated by detection of a current location for the mobile network device 110. (It is noted that the detection of a location for the mobile network device is generally equivalent to detection of a location of the vehicle containing the mobile network device 110.) A system may include any number of maintenance hubs 120, depending on the particular installation and operation. A maintenance hub 120 may be a certain location or zone, or may also include a physical structure, depending on the particular embodiment.

In some embodiments, the maintenance hub feature for the mobile network device 110 includes operation of multiple modes, wherein the selection of a particular mode is based at least in part on a current location of the mobile network device 110. In some embodiments, the multiple modes include, but are not limited to, a maintenance mode for administrative operations, including receipt of configuration data. The multiple modes may further include a service mode for service operations, such as services provided to one or more client devices 140. A mobile network device 110 may include additional modes, such as, for example, a transition mode between the maintenance mode and the service mode, wherein neither administrative operations nor service operations are provided in the transition mode.

Based at least in part on a determination that the mobile network device 110 is located within the maintenance hub 120, the mobile network device 110 is to switch to the maintenance mode, wherein the mobile network device 110 to enable administrative communications and disable service communications in the maintenance mode.

Upon determining that the mobile network device 110 is outside of the maintenance hub 120, the mobile network device is to leave the maintenance mode, the mobile network device 110 to disable administrative communications upon leaving the maintenance mode. The mobile network device 110 is to enable administrative communications only when in the maintenance mode.

In some embodiments, based at least in part on a determination that the mobile device is located outside of a maintenance hub, the mobile network device 110 is to enter the service mode. Entering the service mode may require one or more additional factors, including, for example the mobile network device 110 being a certain distance away from the maintenance hub 120, a certain amount of time having passed since leaving the maintenance hub 120, or a beacon associated with the maintenance hub 120 being no longer detectable. The one or more additional factors may be utilized to ensure that the mobile network device 110 is sufficiently distant from the maintenance hub 120 before the service mode is enabled. The mobile network device 110 is to enable service communications, such as services for client devices 140, in the service mode.

In some embodiments, the mobile network device 110 is to exit the service mode and disable service communications based at least in part on a determination that the mobile network device is located within a maintenance hub 120. In some embodiments, the mobile network device may also exit the service mode based on one or more other factors, including, for example, a determination that the beacon associated with the maintenance hub 120 is detectable by the mobile network device 110. The one or more other factors may be utilized to ensure that the mobile network device 110 exits the service mode prior to being too close to the maintenance hub 120.

The mobile device includes or is connected with a location detection component to determine a current location of the mobile network device. The location detection component may include, but is not limited to, a GPS component. In some embodiments, a mobile network device is to utilize the location detection component to determine a location of the mobile network device for purposes of entering and exiting modes.

Figure 2A:
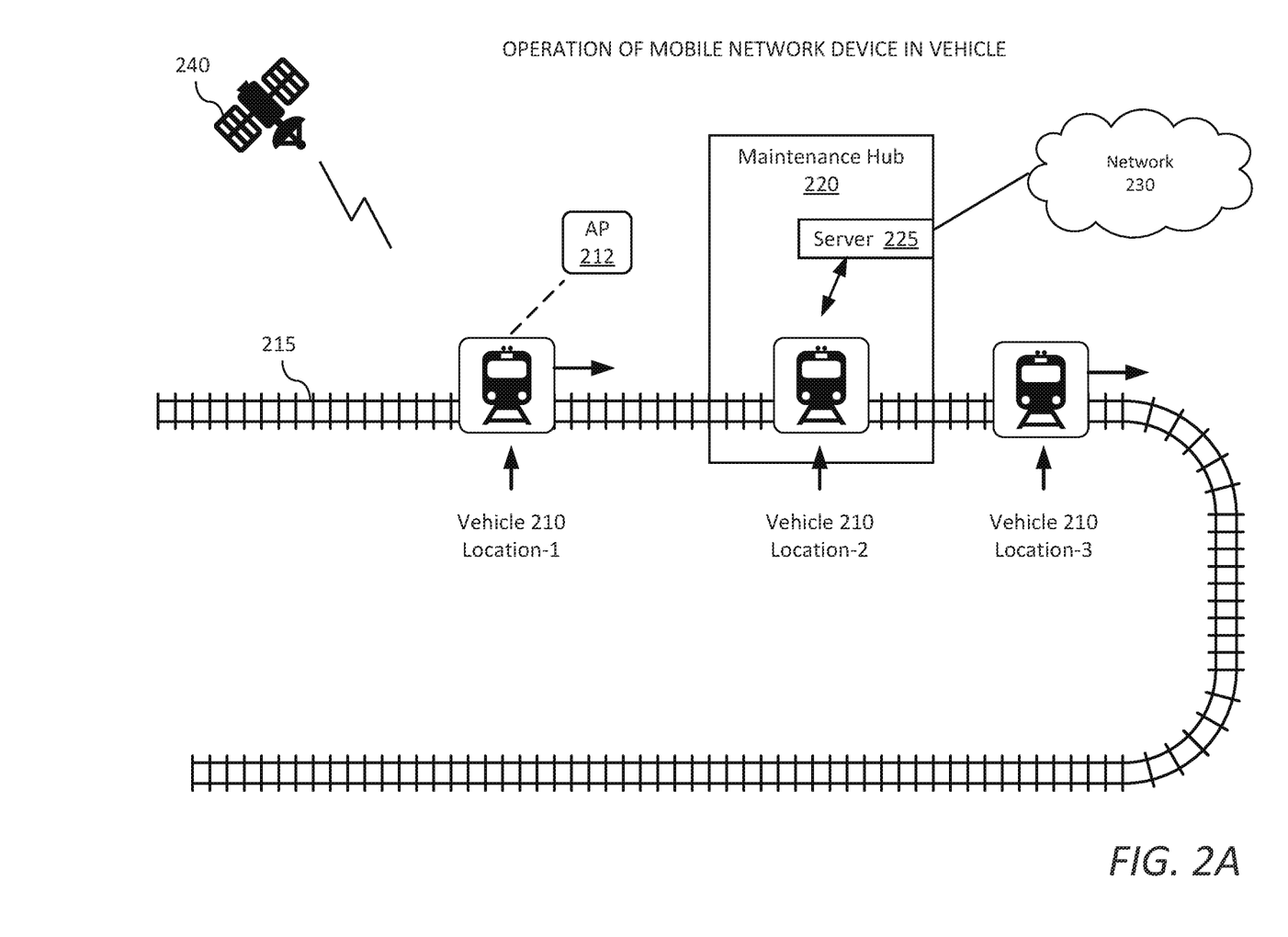
FIG. 2A is an illustration of operation of a mobile network device in a vehicle according to some embodiments.

FIG. 2A is an illustration of operation of a mobile network device in a vehicle according to some embodiments. As illustrated in FIG. 2A, a vehicle 210 is traveling along a route. In this case the vehicle 210 is train car, such as a passenger car, traveling on a track 215, the vehicle 210 including an access point (AP) 212, the AP 212 being a mobile network device, such as mobile network device 110 illustrated in FIG. 1. (The AP 212 is intended to be included within each of the other illustrations of the vehicle 210 in FIGS. 2A and 2B.)

In some embodiments, the AP 212 includes a location detection capability to enable the AP 212 to determine a current location of the AP 212. The location detection capability may include a GPS component to determine location based on signals from multiple GPS satellites 240. However, other location systems may also be utilized by the AP 212.

The AP 212 includes a maintenance hub feature including multiple modes, wherein the selection of a particular mode is based at least in part on a location of the AP 212 as determined by the location detection capability. The multiple modes include a maintenance mode for administrative services, including receipt of configuration data for the AP 212. The multiple modes may further include a service mode for service operation, such as services provided to one or more client devices within the vehicle 210.

In the illustrated example in FIG. 2A, when the vehicle 210 is initially traveling (or stopped) at Position-1, the AP 212 is to detect a location that is outside of a maintenance hub, and thus the AP 212 is not in the maintenance mode. In some embodiments, the AP 212 may be in the service mode, and may be providing service communications for client devices within the vehicle 210. In this illustration, the vehicle 210 at Position-1 may be nearing the end of a route, and will require configuration information for a next route.

Figure 2B:
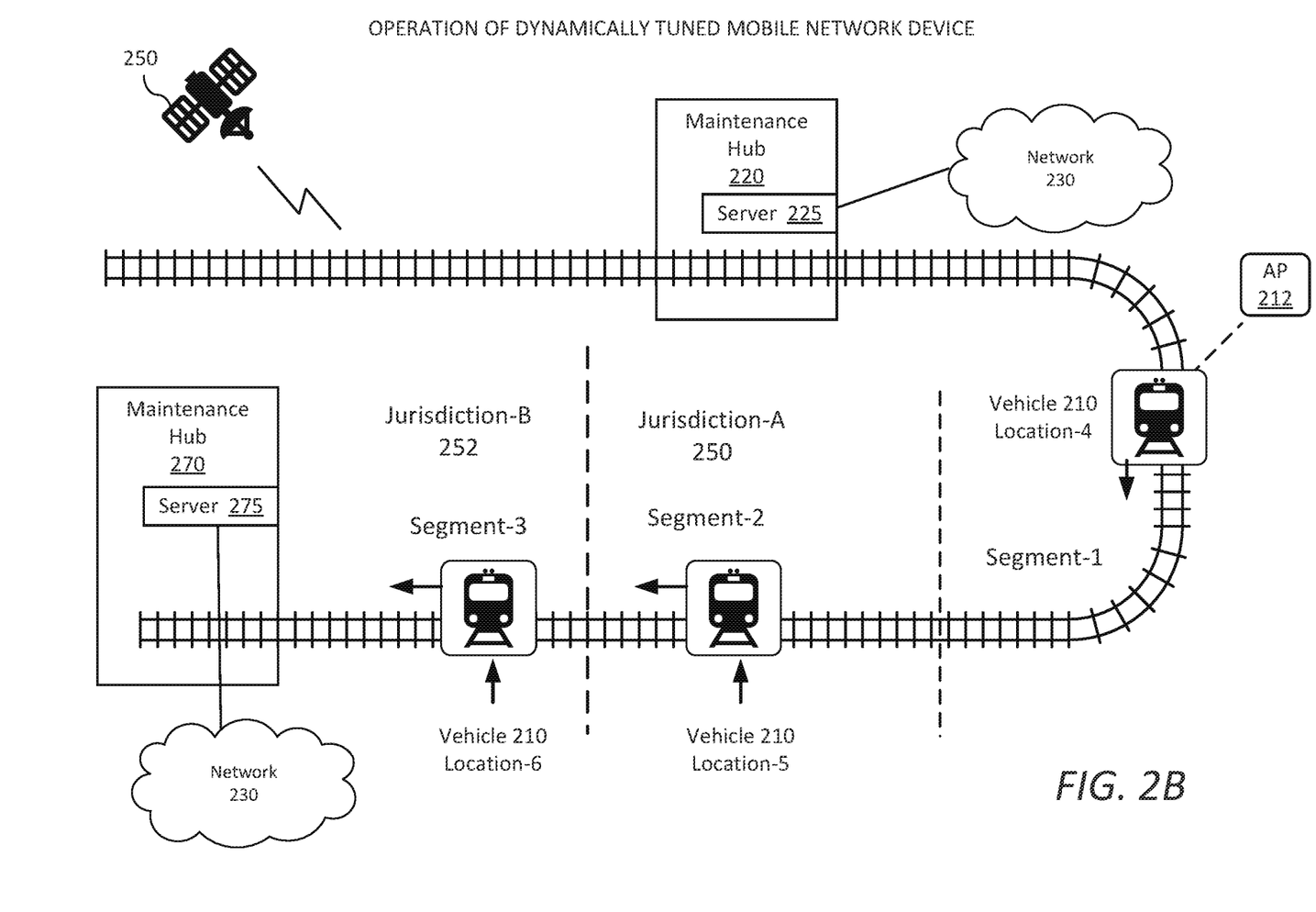
FIG. 2B is an illustration of operation of a dynamically tuned mobile network device according to some embodiments.

Upon continuing on the route along the track 215 and reaching a maintenance hub 220, such as at a major railway station, the AP 212 is to detect a location (Location-2) that is within the maintenance hub 220, In some embodiments, based at least in part on the detected location, the AP 212 is to exit the service mode (or other mode) and disable the service communications, if needed. (In some embodiments the AP 212 may have already exited from the service mode prior to reaching the maintenance hub 220, and thus has already disabled the service communications.) The AP 212 is then to enter the maintenance mode, and enable the maintenance communications with an external server 225 for the maintenance hub 220. The external server may be connected with a network 230 to obtain data related to configuration of the AP 212. In some embodiments, the AP 212 is to receive configuration information from the server 225, wherein the configuration information is based at least in part on a route, such as a new route commencing from the maintenance hub 220, for the vehicle 210. In some embodiments, the configuration information includes configuration data for multiple jurisdictions (such as nations, states, or other legal jurisdictions) along the route to be taken by the vehicle 210. The utilization of the configuration information may be as illustrated in FIG. 2B. In some embodiments, the AP 212 is further to receive data regarding the route for the vehicle, which may include data regarding each route segment of the route.

As illustrated in FIG. 2A, the AP 212, upon the vehicle 210 leaving the maintenance hub 220, will determine a location outside of the maintenance hub 220 (Location-3). In some embodiments, upon the AP 212 determining the location outside the maintenance hub, the AP 212 is to leave the maintenance mode and disable the administrative communications. In some embodiments, based at least in part on a determination that the AP 212 is located outside of a maintenance hub, the AP 212 is to enter another mode, such as the service mode. Entering the service mode may require one or more additional factors to ensure that the AP 212 is sufficiently distant from the maintenance hub 220. Upon entering the service mode, the AP 212 is to enable service communications, such as services for the client devices within the vehicle 210. In some embodiments, the AP 212 further includes a transition mode between the maintenance mode and the service mode, wherein, for example, neither administrative communications nor service communications are provided by the AP 212 while in the transition mode.

FIG. 2B is an illustration of operation of a dynamically tuned mobile network device according to some embodiments. As illustrated in FIG. 2B, a vehicle 210 including AP 212 is traveling along a route. In some embodiments, the configuration of AP 212 has been dynamically tuned, such as through use of server 225 for maintenance hub 220, which may include data received via a connected network 230. For operation along the route, the tuned configuration may, for example, including configuration for multiple route segments and jurisdictions. The route may, for example, include multiple segments, with the AP 212 to be configured for each route segment and as required for each jurisdiction within each segment to ensure that the AP 212 is to operate within any legal or other requirements for the route segment. In some embodiments, the data received by the AP 212 includes data regarding the route, including data regarding each route segment, such as a length of each route segment, a jurisdiction for each route segment, and other information. In the illustrated example in FIG. 2B, the vehicle is to travel a route including at least three segments, with a first segment (Segment-1) and a second segment (Segment-2) being within Jurisdiction-A 250 and a third segment (Segment-3) being within Jurisdiction-B 252. However, a route may include any number of segments and jurisdictions.

For example, upon the vehicle 210 exiting the maintenance hub 220, the AP 212 is to determine locations along the route, such as determination of Location-4, along Segment-1. The AP 212 is to load and operate according to first configuration settings for Segment-1, wherein the first configuration settings are appropriate for operations within Jurisdiction A 250. Upon the AP 212 detecting a location within another segment of the route, the AP 212 is to dynamically change configuration settings to settings for the new route segment. As illustrated in FIG. 2B, upon the vehicle 210 traveling into Segment-2, the AP 212 is to detect a location within Segment-2 (such as Location-5), thus indicating that Segment-1 of the route has ended and the Segment-2 of the route has begun, the AP 212 is to switch to second configuration settings for Segment-2. In this case, Segment-2 is also within Jurisdiction-A 250, and the second configuration settings are consistent with the requirements for Jurisdiction-A 250. The switch between route segments may include a stop of the vehicle, such as at a station, and the switch between configuration settings may occur during such stop if this occurs.

In some embodiments, a switch between route segments may include traveling into another jurisdiction, such as the vehicle entering Segment-3 from Segment-2. The AP 212, upon detecting a location within Segment-3, is to switch to third configuration settings for Segment-3. In this instance Segment-3 is within Jurisdiction-B 252, and the third configuration settings are to be consistent with Jurisdiction-B. As shown in FIG. 2B, Segment-3 of the route may end at a second maintenance hub 270 with server 275, allowing the AP 212 to potentially be dynamically configured for another route.

In some embodiments, the AP 212 may determine location periodically, and may use the locations and time to estimate a speed of travel. In some embodiments, the AP 212 may utilize an estimate regarding the time to travel a route segment based on the estimated speed to determine a time for checking a location of the AP, and prevent the need to constantly check a location of the AP 212 along the route segment. For example, the AP 212 may use a distance of a route segment, such as a distance of Segment-1, and the speed of travel to determine a time when the AP 212 is nearing the end of Segment-1 and the beginning of Segment-2. This may further include nearing a maintenance hub at the end of a route segment. At such time the AP 212 may determine a location of the AP, and determine whether the AP 212 is nearing the segment boundary. If so, the AP 212 may begin monitoring the location continuously or at short intervals to determine when the AP 212 is near or crosses the segment boundary.

Figure 3:
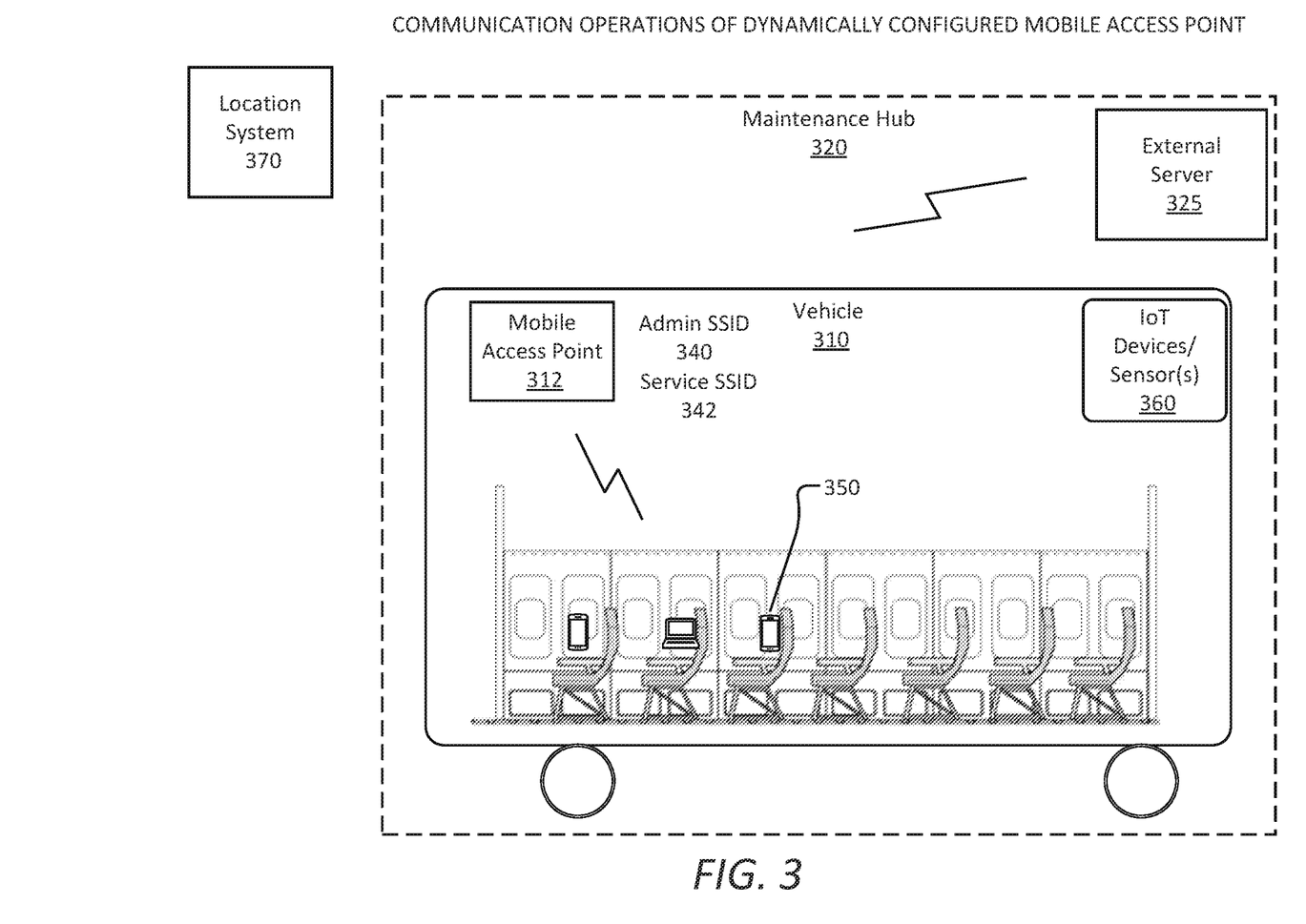
FIG. 3 is an illustration of communication operations of a dynamically configurated mobile access point according to some embodiments.

FIG. 3 is an illustration of communication operations of a dynamically configured mobile access point according to some embodiments. In some embodiments, a vehicle 310, such as train car or motor coach, includes a mobile access point 312, wherein the mobile access point 312 may be installed or embedded in such a manner that the mobile access point 312 cannot be easily accessed. For this reason, it is advantageous to configure the mobile access point 312 via a wireless link to a server.

In some embodiments, the mobile access point 312 includes a maintenance hub feature to enable the mobile access point to connect with an external server 325 of a maintenance hub 320 only when the mobile access point 312 detects a current location (such through use of a location system 370, which may include GPS) that is within the maintenance hub 320. In some embodiments, upon the mobile access point 312 detecting a current location within the maintenance hub 320, the mobile access point 312 may enter a maintenance mode, the mobile access point to transmit an administrative SSID 340 when in the maintenance mode. The external server may then utilize the administrative SSID 340 in connecting with the mobile access point 312 for the purpose of providing administrative services, including providing configuration information to the mobile access point 312, Upon detecting a location other than a location within the maintenance hub 320, the mobile access point 312 is to cease transmission of the administrative SSID 340.

In some embodiments, upon the mobile access point 312 detecting a current location outside the maintenance hub 320, the mobile access point 312 may enter a different mode such as a service mode, the mobile access point to transmit a service SSID 342 when in the service mode. Client devices 350, such as cell phones, tablets, and laptops, may then utilize the service SSID 342 in connecting with the mobile access point 312 for the purpose of receiving user services, such as Internet access or other services. Upon detecting a location within the maintenance hub 320, the mobile access point 312 is to cease transmission of the service SSID 342.

In some embodiments, data received from the external server may include elements in addition to configuration data, including data regarding monitoring of the vehicle. In some embodiments, the mobile access point 312 may access other types of devices while in a service mode, including, for example, Internet of Things (IoT) devices and sensors 360 of the vehicle communicating vie Bluetooth Low Energy (BLE) transmissions. The mobile access point 312 thus may monitor the condition and safety of elements of the vehicle during the service mode. In some embodiments, the mobile access point 312 may include capability of providing notice of sensor conditions indicating problems or safety hazards in the vehicle system, including notices requiring the vehicle 310 to return to a maintenance hub for service.

For example, while in the service mode, if any of the monitored components in the vehicle system goes out of resource or malfunctions, then the respective IoT device or sensor 360 is to notify the mobile access point 312 regarding the condition of the component. In some embodiments, in response to the notification from the IoT device or sensor 360, the mobile access point is to determine whether to continue service on the route, direct the vehicle 310 or operator of such vehicle to proceed to a nearby maintenance hub, or take other appropriate action based on how critical the component is and the severity of the component condition.

Figure 4:
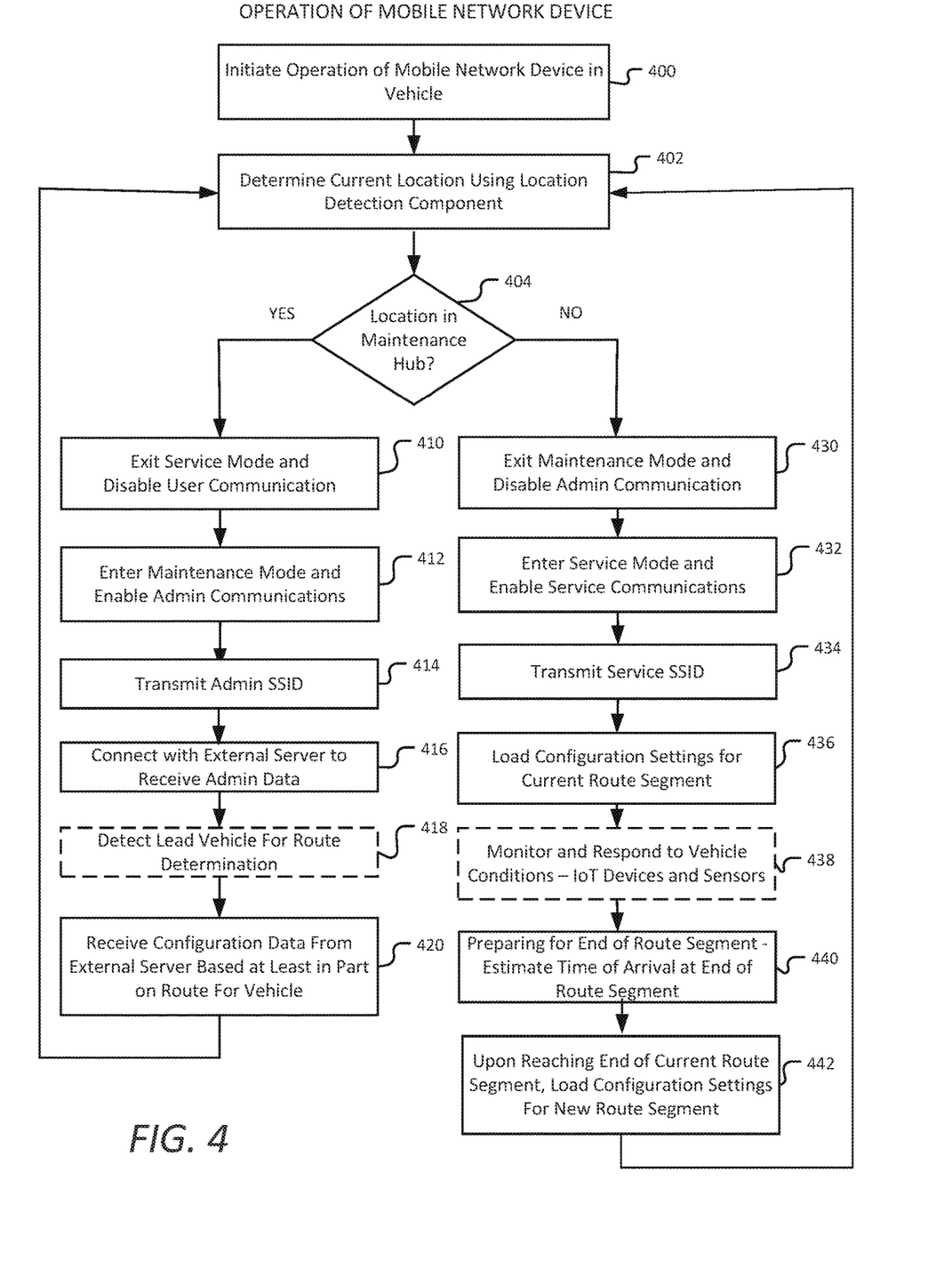
FIG. 4 is a flow chart to illustrate a process for operation of a mobile network device according to some embodiments.

FIG. 4 is a flow chart to illustrate a process for operation of a mobile network device according to some embodiments. In some embodiments, upon initiating operation of a mobile network device in a vehicle 400 (such as a mobile AP 312 in vehicle 310 as illustrated in FIG. 3), the mobile network device may determine a current location using a location detection component such as a GPS component 402. Upon determining a current location within a maintenance hub 404, the mobile network device is to exit a service mode and disable service communications 410 (if this has not already occurred). The mobile network device is then to enter a maintenance mode and enable administrative communications 412, wherein the maintenance mode may include transmission of administrative SSID 414.

In some embodiments, the mobile network device is to connect with an external server to receive administrative data 416. In some embodiments, the data may include a route for the vehicle. In certain implementations, the mobile nets pork device may operate to detect a lead vehicle, such as a train locomotive, for use in determining a route to be taken by the vehicle 418. In some embodiments, the mobile network device is to receive configuration data from the external server based at least in part on the route for the vehicle 420.

In some embodiments, upon determining a current location that is not within a maintenance hub 404, the mobile network device is to exit the maintenance mode and disable administrative communications 430, which includes ceasing transmission of the administrative SSID. The mobile network device may then enter another mode, which may include entering the service mode and enabling service communications 432, wherein the service mode may include transmitting a service SSID 434.

In some embodiments, the mobile network device is to load configuration settings for a current route segment 436, thereby enabling the mobile network device to provide services that are tuned for the current route segment and legal jurisdiction. In some embodiments, the mobile network device may further monitor and respond to vehicle conditions 438, such as, for example, monitoring one or more IoT devices or sensors 360 as illustrated in FIG. 3 and responding to the condition if any of the monitored components in the vehicle system goes out of resource or malfunctions, including determining whether to continue service on the route, direct the vehicle or operator to proceed to a nearby maintenance hub, or take other appropriate action based on how critical the component is and the severity of the component condition.

In some embodiments, operation of the mobile network device may include preparing for the end of a route segment 440, thus allowing for a smooth transition to a modified configuration. Preparing for the end of the route segment may include estimating a time of arrival at the end of the route segment, which may be based on the length of the route segment and an estimated speed determined by the mobile network device. Upon reaching the end of the current route segment, the mobile network device is to load configuration settings for the new route segment to be traveled by the vehicle 442.

Figure 5:
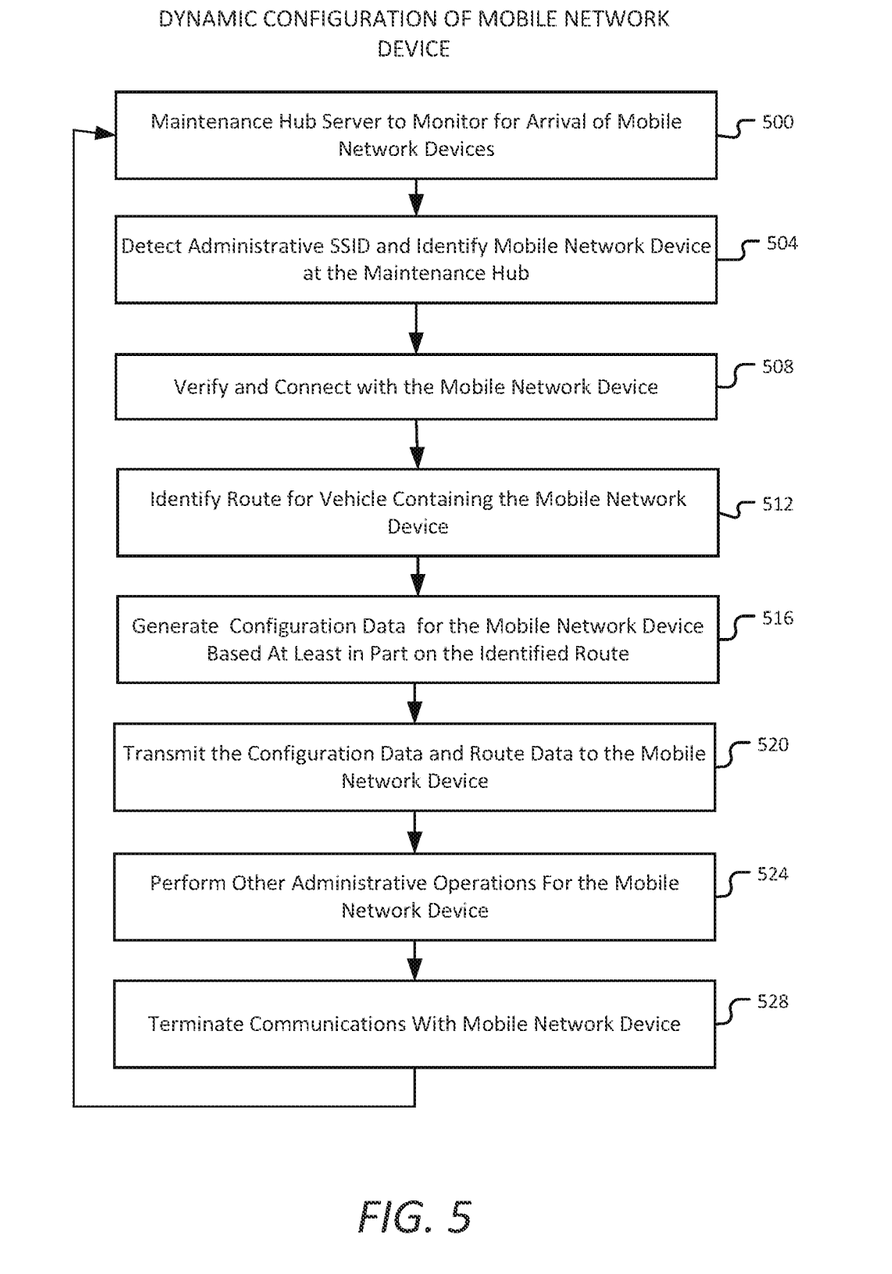
FIG. 5 is a flow chart to illustrate a process for dynamic configuration of a mobile network device according to some embodiments.

FIG. 5 is a flow chart to illustrate a process for dynamic configuration of a mobile network device according to some embodiments. In some embodiments, a server is to monitor for arrival of mobile network devices at a maintenance hub 500. The server may include any known computer server including wireless communication capability to enable communication with a mobile network device. Upon the server detecting an administrative SSID, such as the administrative SSID transmitted by mobile AP 312 in FIG. 3, and identifying a mobile network device at the maintenance hub 504, the server is to verify and connect with the mobile network device 508.

In some embodiments, the server is to identify a route for the vehicle containing the mobile network device 512, and is to generate configuration data for the mobile network device based at least in part on the identified route 516. The identified route may include multiple route segments and jurisdictions (such as nations, states, or other legal jurisdictions), such as the route illustrated in FIG. 2B for vehicle 210, and the determined configuration may include configuration settings that are tuned for each segment of the route to enable the mobile network device to dynamically switch between configuration settings as required. The server is then to transmit the determined configuration data to the mobile network device 520. In some embodiments, server is further to transmit data regarding the route to the mobile network device, the data regarding the route describing the plurality of route segments, which may include length of each route segments, legal jurisdiction for each route segment, and other route information.

The server may then perform any other administrative operations for the mobile network device 524, and terminate communications with the mobile network device 528. The server may then return to monitoring for arrival of mobile network devices at the maintenance hub 500.

Figure 6:
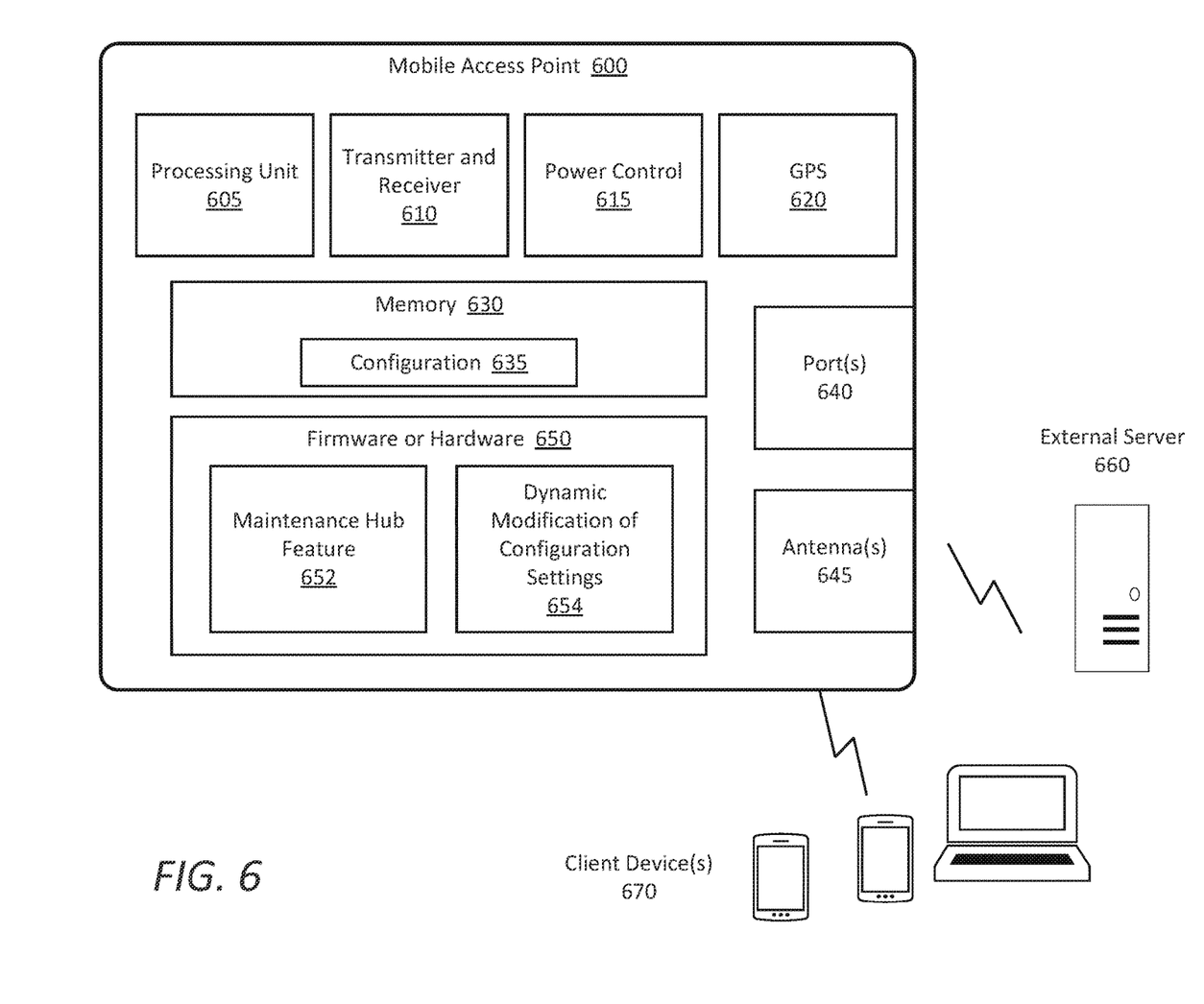
FIG. 6 is block diagram to illustrate an mobile access point according to some embodiments.

FIG. 6 is block diagram to illustrate an mobile access point according to some embodiments. It is noted that a mobile access point includes additional components and elements that are not illustrated in FIG. 6, which is simplified for sake of illustration. In some embodiments, a mobile access point 600 may include, but is not limited to, a Wi-Fi access point operating under one or more IEEE 802.11 protocols. The mobile access point 600 may further provide Bluetooth or other communications depending on the particular implementation. The mobile access point 600 may be installed or embedded in a vehicle, such as, for example, mobile access point 312 in vehicle 310 as illustrated in FIG. 3.

In some embodiments, the mobile access point 600 includes a processing unit 605, a transmitter and receiver 610, power control 615, one or more antennas 645 for wireless signal communication, and one or more ports 640 for other connections. In some embodiments, the mobile access point includes a GPS component 620 to enable determination of a current location for mobile access point 600.

The mobile access point 600 may further include memory 630 for storage of data, which may include volatile and nonvolatile memory (including flash memory and similar elements), registers, and other storage technologies. In some embodiments, the stored data includes configuration data 635, wherein the configuration data 635 may include data for multiple configurations settings for multiple route segments for a route to be traveled by the vehicle containing the mobile access point 600.

In some embodiments, the mobile access point 600 further includes firmware or hardware or both 650. In some embodiments, the firmware or hardware 650 includes a maintenance hub feature 652 providing multiple modes. In some embodiments, upon detecting a location within a maintenance hub, the mobile access point is to switch to a maintenance mode, the mobile access point to enable administrative communications, such as with an external server 660, and disable service communications in the maintenance mode. In some embodiments, upon detecting a location that is outside of a maintenance mode, the mobile network device is to exit the maintenance mode and disable administrative communications. In some embodiments, outside of the maintenance hub the mobile network device is further to enable a service mode, the mobile network device to enable service communications, such as with client device 670, in the service mode. The administrative communications are disabled in any mode other than the maintenance mode.

In some embodiments, the firmware or hardware 650 includes dynamic modification of configuration settings 654. In some embodiments, the mobile access point 600 is to load first configuration settings based on configuration data 635 for a first route segment based at least in part on detection of a current location within the first route segment, and to dynamically switch to second configuration settings for second route segment based at least in part on detection of a transition from the first route segment to the second route segment.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, one or more non-transitory computer-readable storage mediums have stored thereon executable computer program instructions that, when executed by one or more processors, cause the one or more processors to perform operations including switching a mobile network device in a vehicle to a maintenance mode based at least in part on detection of a first location, the first location being a maintenance hub location; enabling administrative communications and disabling user communications for the mobile network device in the maintenance mode; receiving configuration data for the mobile network device from an external server in the maintenance mode, the configuration data being based at least in part on a route for the vehicle; switching the mobile network device to a service mode based at least in part on detection of a second location that is different than the first location; and enabling service communications and disabling administrative communications for the mobile network device in the service mode.

In some embodiments, a mobile access point for a vehicle includes a processor; a memory for data, including configuration data for the mobile access point; a transmitter and receiver for wireless communications; and a GPS (Global Positioning System) component to detect a location of the mobile access point; wherein the mobile access point is to: switch to a maintenance mode based at least in part on detection of a first location by the component, the first location being a maintenance hub location; enable administrative communications and disabling user communications for the mobile access point in the maintenance mode; receive configuration data for the mobile access point from an external server in the maintenance mode, the configuration data being based at least in part on a route for the vehicle; switch to a service mode based at least in part on detection by the GPS component of a second location that is different than the first location; and enable service communications and disable administrative communications for the mobile access point in the service mode.

In some embodiments, a method includes monitoring for arrival of mobile access points at a maintenance hub, detecting an administrative SSID (Service Set Identifier) from a first mobile access point in a vehicle; verifying and connecting with the mobile access point; identifying a route for the vehicle; determining configuration data for the mobile access point based at least in part on the identified route; transmitting the configuration data to the mobile access point; and terminating communications with the mobile access point.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment,

What is claimed is:

1. One or more non-transitory computer-readable storage mediums having stored thereon executable computer program instructions that, when executed by one or more processors, cause the one or more processors to perform operations comprising:
   switching a mobile network device in a vehicle to a maintenance mode based at least in part on detection of a first location, the first location being a maintenance hub location;
   enabling administrative communications and disabling user communications for the mobile network device in the maintenance mode;
   receiving configuration data for the mobile network device from an external server in the maintenance mode, the configuration data being based at least in part on a route for the vehicle;
   switching the mobile network device to a service mode based at least in part on detection of a second location that is different than the first location; and
   enabling service communications and disabling administrative communications for the mobile network device in the service mode.

2. The one or more non-transitory computer-readable storage mediums of claim 1, further comprising executable computer program instructions that, when executed by the one or more processors, cause the one or more processors to perform operations comprising:
   upon switching to the maintenance mode, enabling transmission of an administrative SSID (Service Set Identifier) and disabling transmission of a user SSID; and
   upon switching to the service mode, enabling transmission of the user SSID and disabling transmission of the administrative SSID.

3. The one or more mediums of claim 1, further comprising executable computer program instructions that, when executed by the one or more processors, cause the one or more processors to perform operations comprising:
   providing services to one or more client devices within the vehicle in the service mode.

4. The one or more mediums of claim 1, wherein the route includes a plurality of route segments, the received configuration data including configuration data relating to each of the plurality of route segments.

5. The one or more mediums of claim 4, wherein the received configuration is based at least in part on requirements for one or more jurisdictions that are included in the route.

6. The one or more mediums of claim 4, further comprising executable computer program instructions that, when executed by the one or more processors, cause the one or more processors to perform operations comprising:
   detecting a current location in a first route segment of the plurality of route segments; and
   utilizing the configuration data to load first configuration settings for the first route segment.

7. The one or more mediums of claim 6, further comprising executable computer program instructions that, when executed by the one or more processors, cause the one or more processors to perform operations comprising:
   subsequent to loading the first configuration settings, detecting a current location in a second route segment of the plurality of route segments; and
   dynamically switching from the first configuration settings to second configuration settings for the second route segment.

8. The one or more mediums of claim 7, further comprising executable computer program instructions that, when executed by the one or more processors, cause the one or more processors to perform operations comprising:
   upon detecting the location in the first route segment, estimating a time of arrival at the second route segment based at least in part on a length of the first route segment and an estimated speed of travel for the vehicle; and
   upon nearing the estimated time of arrival, monitoring the current location to detect when the vehicle arrives at the second route segment.

9. A mobile access point for a vehicle comprising:
a processor;

a memory for data, including configuration data for the mobile access point;

a transmitter and receiver for wireless communications; and a GPS (Global Positioning System) component to detect a location of the mobile access point;

wherein the mobile access point is to:

switch to a maintenance mode based at least in part on detection of a first location by the component, the first location being a maintenance hub location;

enable administrative communications and disable user communications for the mobile access point in the maintenance mode;

receive configuration data for the mobile access point from an external server in the maintenance mode, the configuration data being based at least in part on a route for the vehicle;

switch to a service mode based at least in part on detection by the GPS component of a second location that is different than the first location; and     enable service communications and disable administrative communications for the mobile access point in the service mode.

10. The mobile access point of claim 9, wherein the mobile access point is further to:

upon switching to the maintenance mode, enable transmission of an administrative SSID (Service Set Identifier) and disable transmission of a user SSID; and     upon switching to the service mode, enable transmission of the user SSID and disable transmission of the administrative SSD.

11. The mobile access point of claim 9, wherein the mobile access point is further to:

provide services to one or more client devices within the vehicle in the service mode.

12. The mobile access point of claim 9, wherein the route includes a plurality of route segments, the received configuration data including configuration data relating to each of the plurality of route segments.

13. The mobile access point of claim 12, wherein the mobile access point is further to:

detect a current location in a first route segment of the plurality of route segments;

utilize the configuration data to load first configuration settings for the first route segment;

subsequent to loading the first configuration settings, detect a current location in a second route segment of the plurality of route segments; and     dynamically switch from the first configuration settings to second configuration settings for the second route segment.

14. The mobile access point of claim 9, the vehicle including one or more Internet of Things (IoT) devices or sensors, the mobile access point further to:

monitor the one or more IoT devices or sensors of the vehicle while in the service mode; and     determine a response to device or sensor conditions that indicate problems or safety hazards.

15. The mobile access point of claim 9, wherein switching to the service mode is further based on one or more additional factors to ensure that the mobile access point is sufficiently distant from the maintenance hub before the service mode is enabled.

16. The mobile access point of claim 9, wherein the vehicle is a train car of a railroad, and the maintenance hub is located at a railroad station.

17. A method comprising:

monitoring for arrival of mobile access points at a maintenance hub;

detecting an administrative SSID (Service Set Identifier) from a first mobile access point in a vehicle;

verifying and connecting with the mobile access point;

identifying a route for the vehicle;

determining configuration data for the mobile access point based at least in part on the identified route;

transmitting the configuration data to the mobile access point; and     terminating communications with the mobile access point.

18. The method of claim 17, wherein the route includes a plurality of route segments, generating the configuration data including generating configuration data relating to each of the plurality of route segments.

19. The method of claim 18, wherein the route includes a plurality of jurisdictions, generating the configuration data including generating configuration data that is based at least in part on requirements for each jurisdiction of the plurality of jurisdictions.

20. The method of claim 18, further comprising transmitting data regarding the route to the mobile access point, the data including data regarding the route segments.

* * * * *